US007690792B2

(12) United States Patent
Matsuzawa

(10) Patent No.: US 7,690,792 B2
(45) Date of Patent: Apr. 6, 2010

(54) PROJECTOR AND METHOD OF CONTROLLING ULTRASONIC SPEAKER IN PROJECTOR

(75) Inventor: Kinya Matsuzawa, Nagano (JP)

(73) Assignee: Seiko Epson Corporation (JP)

( * ) Notice: Subject to any disclaimer, the term of this patent is extended or adjusted under 35 U.S.C. 154(b) by 653 days.

(21) Appl. No.: 11/596,747

(22) PCT Filed: Apr. 27, 2005

(86) PCT No.: PCT/JP2005/008454

§ 371 (c)(1),
(2), (4) Date: Nov. 16, 2006

(87) PCT Pub. No.: WO2006/006294

PCT Pub. Date: Jan. 19, 2006

(65) Prior Publication Data

US 2008/0055548 A1 Mar. 6, 2008

(30) Foreign Application Priority Data

Jul. 9, 2004 (JP) ............................. 2004-202740

(51) Int. Cl.
*G03B 31/00* (2006.01)
*G03B 21/00* (2006.01)
*G01N 29/00* (2006.01)
*G01H 11/00* (2006.01)

(52) U.S. Cl. .......................... 353/15; 353/121; 73/1.82; 73/1.46; 73/649

(58) Field of Classification Search ................... 353/15, 353/18, 121, 122; 73/1.82, 1.46, 649; 381/116
See application file for complete search history.

(56) References Cited

U.S. PATENT DOCUMENTS 5,287,331 A * 2/1994 Schindel et al. ............. 367/140

(Continued)

FOREIGN PATENT DOCUMENTS

EP 0 973 152 A 1/2000

(Continued)

OTHER PUBLICATIONS

International Search Report and Written Opinion of the International Searching Authority (in English) for PCT/JP2005/008454, ISA/EP, Rijswijk, mailed Sep. 6, 2005.

(Continued)

*Primary Examiner*—Georgia Y Epps
*Assistant Examiner*—Magda Cruz
(74) *Attorney, Agent, or Firm*—Harness, Dickey & Pierce, P.L.C.

(57) ABSTRACT

A projector having an ultrasonic speaker including an ultrasonic transducer for emitting an ultrasonic wave signal to a screen; a distance measuring device for measuring a distance between the ultrasonic transducer and the screen; and an ultrasonic frequency control device for controlling a frequency of the ultrasonic wave signal based on a measured result of the distance measuring device and a sound pressure of the ultrasonic wave signal emitted by the ultrasonic transducer, so that the ultrasonic wave signal has a predetermined sound pressure at or in a vicinity of the screen. The projector may include a storage device for storing a propagation loss characteristic in air of the ultrasonic wave signal emitted from the ultrasonic transducer. The ultrasonic frequency control device controls the frequency of the ultrasonic wave signal by referring to the propagation loss characteristic of the ultrasonic wave signal stored in the storage device.

9 Claims, 10 Drawing Sheets

U.S. PATENT DOCUMENTS

| | | | | |
|---|---|---|---|---|
| 6,510,225 | B1 | 1/2003 | Robertson et al. | |
| 6,775,388 | B1 | 8/2004 | Pompei | |
| 6,798,889 | B1 * | 9/2004 | Dicker et al. | 381/303 |
| 2001/0007591 | A1 | 7/2001 | Pompei | |
| 2004/0047477 | A1 | 3/2004 | Bank et al. | |
| 2005/0046803 | A1 * | 3/2005 | Akutsu | 353/69 |
| 2008/0212033 | A1 * | 9/2008 | Fukui et al. | 353/15 |

FOREIGN PATENT DOCUMENTS

| | | |
|---|---|---|
| JP | 2000-111645 | 4/2000 |

OTHER PUBLICATIONS

Masuda, Ryousuke, "Hajimeteno Sensa Gijutsu," Beginner's Books Series vol. 2, Kogyo Chosakai Publishing Inc., pp. 131-133, Nov. 18, 1998.

* cited by examiner

PROJECTOR AND METHOD OF CONTROLLING ULTRASONIC SPEAKER IN PROJECTOR

TECHNICAL FIELD

The present invention relates to a projector using an ultrasonic speaker for generating a certain high sound pressure over a wide frequency range and to a method of controlling the ultrasonic speaker in the projector, and in particular, relates to the projector and the control method for solving a problem of self-demodulation having directivity of an ultrasonic sound signal emitted to a screen together with images, caused when the signal reflected by the screen still includes a strong ultrasonic signal.

Priority is claimed on Japanese Patent Application No. 2004-202740, filed Jul. 9, 2004, the content of which is incorporated herein by reference.

BACKGROUND ART

It is conventionally known that ultrasonic speakers using a non-linear effect of the medium (i.e., air) on an ultrasonic wave (signal) can reproduce a signal in an audio (i.e., human-audible) frequency band, which has far higher directivity in comparison with normal speakers. Representative examples of the ultrasonic speaker employ a resonant ultrasonic transducer or an electrostatic ultrasonic transducer.

FIG. 11A is a diagram showing an example of the structure of the resonant (or piezoceramic) ultrasonic transducer, while FIG. 11B is a diagram showing an example of the structure of the electrostatic ultrasonic transducer (refer to Ryousuke Masuda, "Hajimeteno Sensa Gijutsu", Beginner's Books Series Vol. 2, Kogyo Chosakai Publishing Inc., pp. 131-133, Nov. 18, 1998).

The ultrasonic transducer shown in FIG. 11A is a bimorph ultrasonic transducer having two piezoceramic elements 161 and 162, a cone 163, a case 164, leads 165 and 166, and a screen 167. The piezoceramic elements 161 and 162 are adhered to each other, and the leads are respectively connected to the faces of the piezoceramic elements, on the opposite sides of the adhesion faces. The resonant transducer uses a resonance phenomenon of piezoelectric ceramics; thus, preferable ultrasonic transmitting and receiving characteristics are obtained in a relatively narrow frequency range in the vicinity of the resonance frequency.

The ultrasonic transducer shown in FIG. 11B is an electrostatic ultrasonic transducer having wide band frequency characteristics. As shown in FIG. 11B, the electrostatic ultrasonic transducer has a dielectric (material) 181 (i.e., an insulator) such as a PET polyethylene terephthalate) resin having a thickness of a few micrometers (approximately, 3 to 10 μm), as a vibrator. On the upper surface of the dielectric 181, an upper electrode 182, which is a foil made of metal, is integrally formed by vapor deposition or the like. In addition, a lower electrode 183 (a fixed electrode) made of brass is provided, which contacts the lower surface of the dielectric 181 which functions as a vibrating film or membrane. A lead 184 is connected to the lower electrode 183, and the lower electrode 183 is fastened to a base plate 185 made of Bakelite (a registered trademark of the Union Carbide Corporation) or the like. The dielectric 181, the upper electrode 182, and the base plate 185 are fixedly enclosed in a case 180, together with metal rings 186, 187, and 188, and a mesh 189.

On a surface of the lower electrode 183, which faces the dielectric 181, microgrooves having a (groove) width of approximately a few tens to a few hundreds of micrometers and having irregular forms are formed. The microgrooves function as gaps between the lower electrode 183 and the dielectric 181, which slightly change the distribution of electric capacitance between the upper electrode 182 and the lower electrode 183. Such microgrooves having irregular forms are formed by randomly scoring the surface of the lower electrode 183 with a file. Accordingly, the electrostatic ultrasonic transducer has an enormous number of capacitors having gaps whose areas and depths are not uniform, thereby rendering the ultrasonic transducer capable of producing sound in a wide frequency range in the frequency characteristics. The present invention uses an electrostatic ultrasonic transducer which will be explained in detail later.

As explained above, different from the resonant ultrasonic transducers, the electrostatic ultrasonic transducers are conventionally known as wide band transducers which can generate relatively high sound pressure over a wide frequency band.

However, when the above-explained electrostatic ultrasonic transducer is mounted into a projector so as to emit an ultrasonic wave signal onto a screen, the signal reflected by the screen may still include a strong ultrasonic wave due to strong directivity of the ultrasonic signal, and thus self-demodulation having directivity may occur after the reflection.

This phenomenon is not preferable for speakers used in projectors. More specifically, the reflected sound signal proceeds in the form of a beam and thus the spread of sound is reduced. This is a strong limitation when a number of people share images and sounds in a home theater or in an environment for the education/culture market, and a solution to this problem has been earnestly desired.

DISCLOSURE OF INVENTION

In view of the above circumstances, an object of the present invention is to provide a projector and a method of controlling an ultrasonic speaker in the projector, to solve the problem of self-demodulation having directivity of an ultrasonic sound signal emitted to a screen together with images, caused when the signal reflected by the screen still includes a strong ultrasonic signal.

Therefore, the present invention provides a projector comprising:

an ultrasonic speaker including an ultrasonic transducer for emitting an ultrasonic wave signal to a screen;

a distance measuring device for measuring a distance between the ultrasonic transducer and the screen; and an ultrasonic frequency control device for controlling a frequency of the ultrasonic wave signal based on a measured result of the distance measuring device and a sound pressure of the ultrasonic wave signal emitted by the ultrasonic transducer, so that the ultrasonic wave signal has a predetermined sound pressure at or in a vicinity of the screen.

According to the above structure, the distance between the ultrasonic transducer and the screen is measured by the distance measuring device which may be an ultrasonic sensor. Based on the measured distance data, the carrier frequency of the ultrasonic speaker can be selected and determined by the ultrasonic frequency control device. Generally, it is preferable to secure a desired (i.e., predetermined) sound pressure (e.g., approximately 120 dB) at or in a vicinity of the screen. Therefore, the frequency of the ultrasonic wave signal is controlled so as to secure a predetermined sound pressure (e.g., approximately 120 dB) at or in a vicinity of the screen in accordance with relationships between the frequency and the loss of the ultrasonic wave signal (i.e., attenuation characteristics according to the frequency and the propagation distance in the air). Accordingly, it is possible to secure the desired sound pressure at or in a vicinity of the screen. As a result, even when using an ultrasonic speaker having strong directivity, no self-demodulation of the ultrasonic wave signal reflected by the screen is produced, and human-audible sound, produced by self-demodulation before reflection, is reflected by the screen and spreads over a wide area in a room, which is effective in a home theater or in an environment for the education/culture market.

The projector may further comprise:

a storage device for storing a propagation loss characteristic in air of the ultrasonic wave signal emitted from the ultrasonic transducer, wherein:

the ultrasonic frequency control device controls the frequency of the ultrasonic wave signal by referring to the propagation loss characteristic of the ultrasonic wave signal stored in the storage device.

In this case, the propagation loss characteristic of the ultrasonic wave signal emitted from the ultrasonic transducer (i.e., attenuation characteristics according to the frequency and the propagation distance in the air) is stored in advance in the storage device of the projector. In accordance with the distance between the ultrasonic transducer and the screen, measured by the distance measuring device, the frequency of the ultrasonic wave signal is determined so as to obtain a desired sound pressure (e.g., approximately 120 dB) at or in a vicinity of the screen. Accordingly, it is possible to secure the desired sound pressure at or in a vicinity of the screen. Therefore, as explained above, even when using an ultrasonic speaker having strong directivity, no self-demodulation of the ultrasonic wave signal reflected by the screen is produced, and human-audible sound, produced by self-demodulation before reflection, is reflected by the screen and spreads over a wide area in a room, which is effective in a home theater or in an environment for the education/culture market.

Preferably, the ultrasonic frequency control device computes a frequency of the ultrasonic wave signal emitted by the ultrasonic transducer, by which the ultrasonic wave signal has the predetermined sound pressure at or in a vicinity of the screen, based on the measured result of the distance measuring device and a specific operation formula which indicates a propagation loss characteristic in air of the ultrasonic wave signal. Accordingly, after measuring the distance between the ultrasonic transducer and the screen by using the distance measuring device, the specific operation formula, which indicates the propagation loss characteristic (i.e., attenuation characteristic according to the frequency and the propagation distance) in the air of the ultrasonic wave signal, is used for computing the frequency of the ultrasonic wave signal emitted by the ultrasonic transducer, by which the ultrasonic wave signal has the predetermined sound pressure at or in a vicinity of the screen. The frequency of the ultrasonic wave signal is controlled to reach the computed value.

In an example, the distance measuring device is an independent device separate from the ultrasonic speaker and employs an ultrasonic sensor for measuring the distance. In this case, the distance measuring device can be efficiently realized by effectively using parts or circuits included in the ultrasonic transducer (for sound signals) mounted in the projector.

In another example, the distance measuring device is an independent device separate from the ultrasonic speaker and employs an infrared sensor for measuring the distance. In this case, a desired type among various types of commercially available infrared sensors can be selected and used.

In another example, the distance measuring device includes a first ultrasonic transducer for transmitting an ultrasonic wave to the screen and a second ultrasonic transducer for receiving a reflected wave from the screen. In this case, the structure of the circuit for controlling the distance measuring device can be simplified. In addition, distance measurement can be performed continuously.

In another example, the distance measuring device includes an ultrasonic transducer which transmits an ultrasonic wave to the screen and also receives a reflected wave from the screen. This ultrasonic transducer is used alternatively for transmitting and receiving the ultrasonic wave by using a switch or the like. Accordingly, the distance between the ultrasonic transducer and the screen can be measured by a single ultrasonic transducer, and the distance measuring device can be economically realized.

In another example, the ultrasonic transducer (for sound signals) also functions as an ultrasonic sensor for measuring the distance in the distance measuring device. Therefore, no additional ultrasonic sensor is necessary, thereby realizing an economical system.

The present invention also provides a method of controlling an ultrasonic speaker which includes an ultrasonic transducer for emitting an ultrasonic wave signal to a screen, the method comprising:

measuring a distance between the ultrasonic transducer and the screen; and controlling a frequency of the ultrasonic wave signal based on a measured result of the distance measuring device and a sound pressure of the ultrasonic wave signal emitted by the ultrasonic transducer, so that the ultrasonic wave signal has a predetermined sound pressure at or in a vicinity of the screen.

According to the above method, the distance between the ultrasonic transducer and the screen is measured by using a distance measuring device which may be an ultrasonic sensor. Based on the measured distance data, the carrier frequency of the ultrasonic speaker can be selected and determined. As explained above, it is preferable to secure a desired (i.e., predetermined) sound pressure (e.g., approximately 120 dB) at or in a vicinity of the screen. Therefore, the frequency of the ultrasonic wave signal is controlled so as to secure a predetermined sound pressure at or in a vicinity of the screen in accordance with relationships between the frequency and the loss of the ultrasonic wave signal (i.e., attenuation characteristics according to the frequency and the propagation distance in the air). Accordingly, even when using an ultrasonic speaker having strong directivity, no self-demodulation of the ultrasonic wave signal reflected by the screen is produced, and human-audible sound, produced by self-demodulation before reflection, is reflected by the screen and spreads over a wide area in a room, which is effective in a home theater or in an environment for the education/culture market.

BRIEF DESCRIPTION OF THE DRAWINGS

FIG. 4A is a block diagram for showing the structure, and FIG. 4B is a diagram showing operational waveforms (i.e., temporal variations in voltage).

BEST MODE FOR CARRYING OUT THE INVENTION

Hereinbelow, an embodiment of the best mode for carrying out the present invention will be explained with reference to the drawings.

Figure 1:
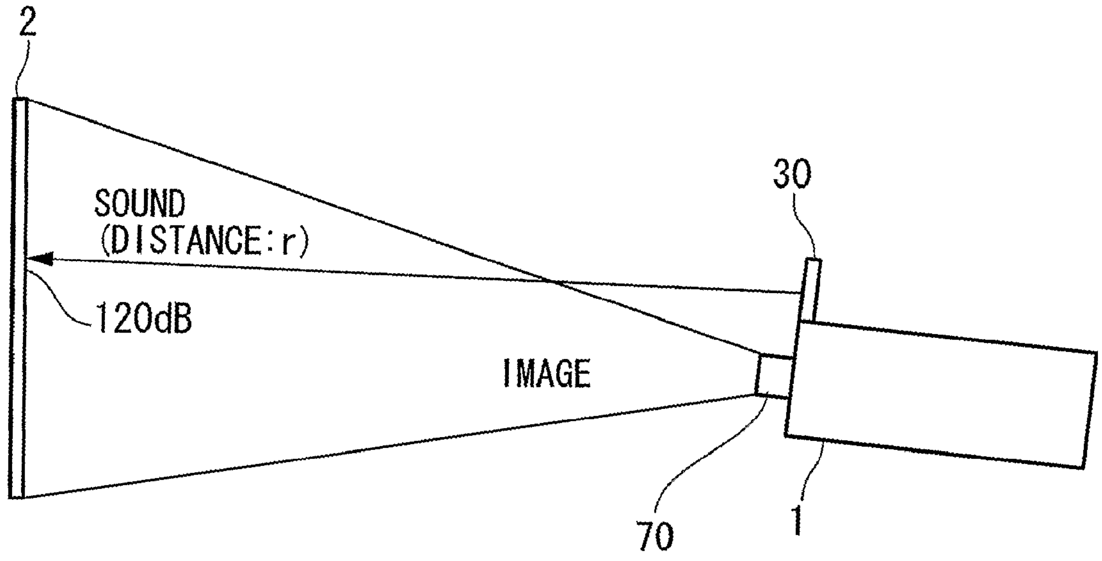
FIG. 1 is a diagram showing the positional relationship between the projector and the screen in an embodiment according to the present invention.

FIG. 1 is a diagram showing the positional relationship between the projector and the screen in the embodiment. From the projector 1, ultrasonic sound signals are emitted via an ultrasonic transducer 30 together with images which are projected via a projection lens 70. In the ultrasonic emission, what is important is the sound pressure of the ultrasonic waves (signal) on and immediately in front of the screen. When the sound pressure exceeds 120 dB even after reflection, self-demodulation of the reflected sound signal has high directivity and thus the audio (i.e., human-audible) sound reflected by the screen does not spread very much due to remaining directivity.

Therefore, it is important that the sound pressure of the ultrasonic wave on and immediately in front of the screen 2 is approximately 120 dB. In this case, the audio sound which has been self-demodulated and then reflected by the screen 2 spreads toward the surroundings immediately after the reflection by the screen 2, so that the audience in a wide area can hear the sound.

Accordingly, in the projector of the present embodiment, the sound pressure of the ultrasonic wave emitted from the ultrasonic transducer 30 is controlled to have a value in the vicinity of 120 dB at or immediately in front of the screen 2, by using attenuation characteristics in accordance with the frequency and the propagation distance of the ultrasonic waves transmitted in the air. In this case, the distance r between the ultrasonic transducer 30 and the screen 2 should be measured. As a device for measuring this distance r, an infrared sensor may be used. However, the ultrasonic transducer can also be used as a distance sensor; thus, in this embodiment, an ultrasonic transducer is used as the distance sensor.

Figure 2:
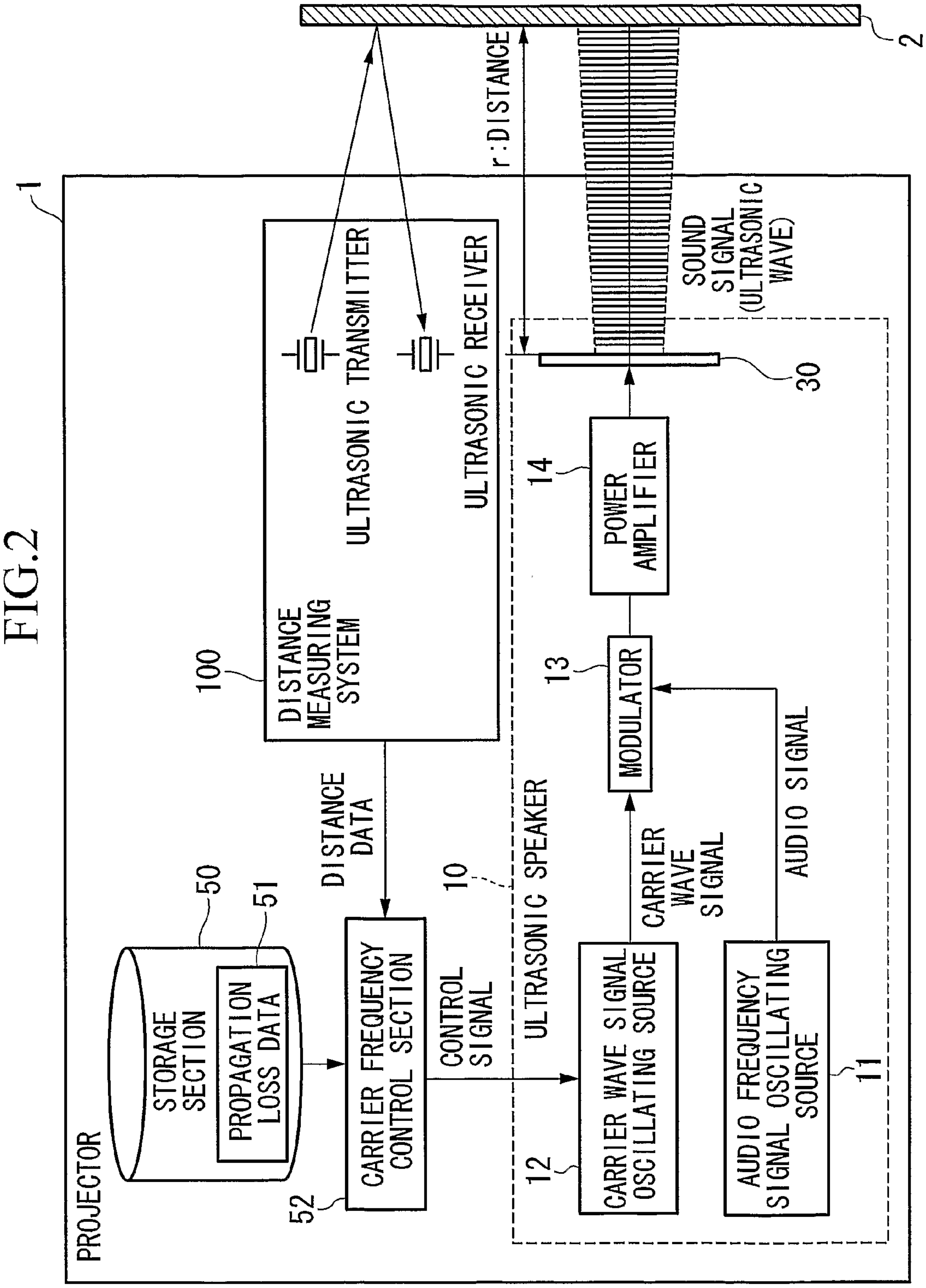
FIG. 2 is a block diagram showing the structure of the projector in the embodiment.

FIG. 2 is a block diagram showing the structure of the projector in the present embodiment, in which only portions directly relating to the present invention are shown and the image projecting system is omitted.

In the structure shown in FIG. 2, a distance measuring system 100 (i.e., the distance measuring device), a storage section 50 (i.e., the storage device), and a carrier (wave) frequency control section 52 (i.e., the ultrasonic frequency control device), which are elements for realizing the functions of the present invention, are added to an ordinary ultrasonic speaker 10.

Reference numeral 11 indicates an audio frequency signal oscillating source for generating an audio (sound) signal in an audio (i.e., human-audible) frequency band. Reference numeral 12 indicates a carrier wave signal oscillating source for oscillating a carrier wave signal in an ultrasonic frequency band (e.g., a sine wave having a frequency of 40 kHz). In addition, the carrier wave signal oscillating source 12 can generate a carrier wave signal whose frequency is variable (e.g., within a range from 20 kHz to 100 kHz).

Reference numeral 13 indicates a modulator for subjecting the carrier wave signal output from the carrier wave signal oscillating source 12 to modulation using the audio signal received from the audio frequency signal oscillating source 11, so as to produce a modulated signal. Reference numeral 14 indicates a power amplifier for amplifying the modulated signal received from the modulator 13.

The ultrasonic transducer 30 converts the modulated signal amplified by the power amplifier 14 to a sound wave (signal) having a finite amplitude level (i.e., an ultrasonic wave) and emits the sound wave toward the medium (i.e., air).

The distance measuring system 100 is a system for measuring the distance between the ultrasonic transducer 30 and the screen 2, and includes ultrasonic sensors such as an ultrasonic transmitter, an ultrasonic receiver, and the like. The carrier frequency control section 52 receives distance data (of the distance between the ultrasonic transducer 30 and the screen 2) from the distance measuring system 100 and generates a control signal for the carrier frequency by referring to propagation loss data 51 stored in the storage section 50. The generated control signal is sent to the carrier wave signal oscillating source 12.

The carrier frequency control section 52 variably sets the frequency of the carrier wave signal output from the carrier wave signal oscillating source 12. That is, in the control of this section, the frequency of the carrier wave signal is varied in accordance with the distance data received from the distance measuring system 100, so that the ultrasonic sound signal has a sound pressure of approximately 120 dB, at or immediately in front of the screen 2.

A specific example of the structure of the distance measuring system 100 and the operation of the system will be explained below, and the propagation loss data 51 stored in the storage section 50 will be explained in detail below.

Figure 11A:
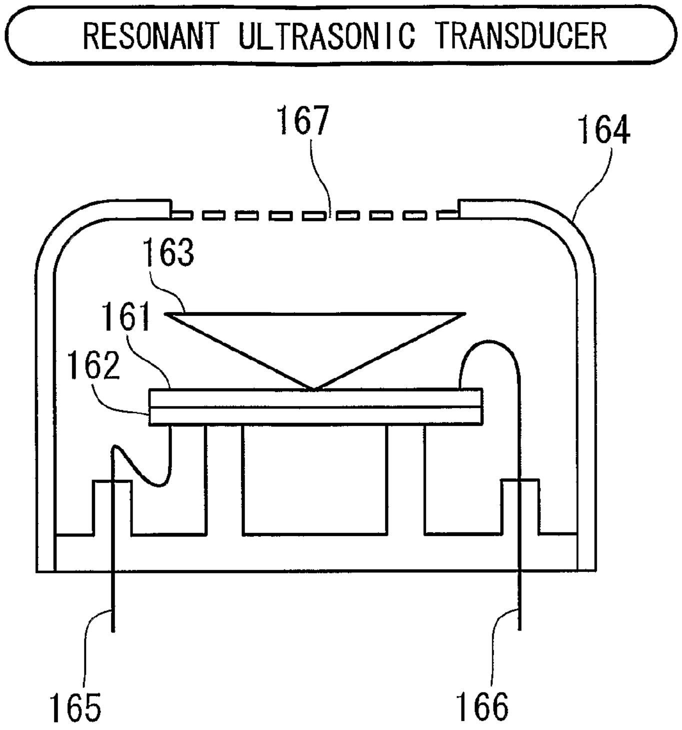
FIG. 11A is a diagram showing an example of the structure of a conventional resonant ultrasonic transducer.
Figure 11B:
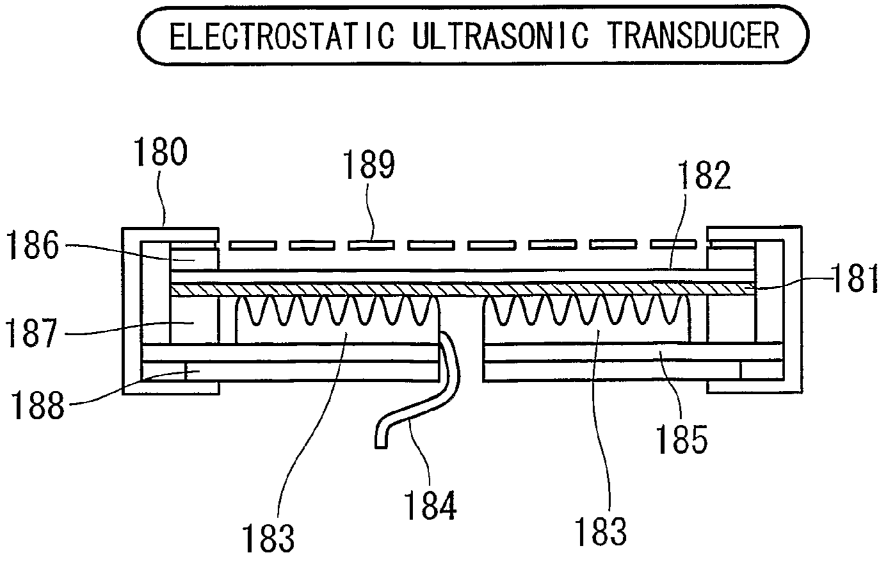
FIG. 11B is a diagram showing an example of the structure of a conventional electrostatic ultrasonic transducer.

The electrostatic wide band ultrasonic transducer used in the projector of the present embodiment will be explained below. In this embodiment, a wide band ultrasonic transducer is necessary so as to variably control the frequency of the carrier wave. As the wide band ultrasonic transducer, an electrostatic wide band ultrasonic transducer as shown in FIG. 3A may be used as well as the electrostatic wide band ultrasonic transducer as shown in FIG. 11B.

Figure 3A:
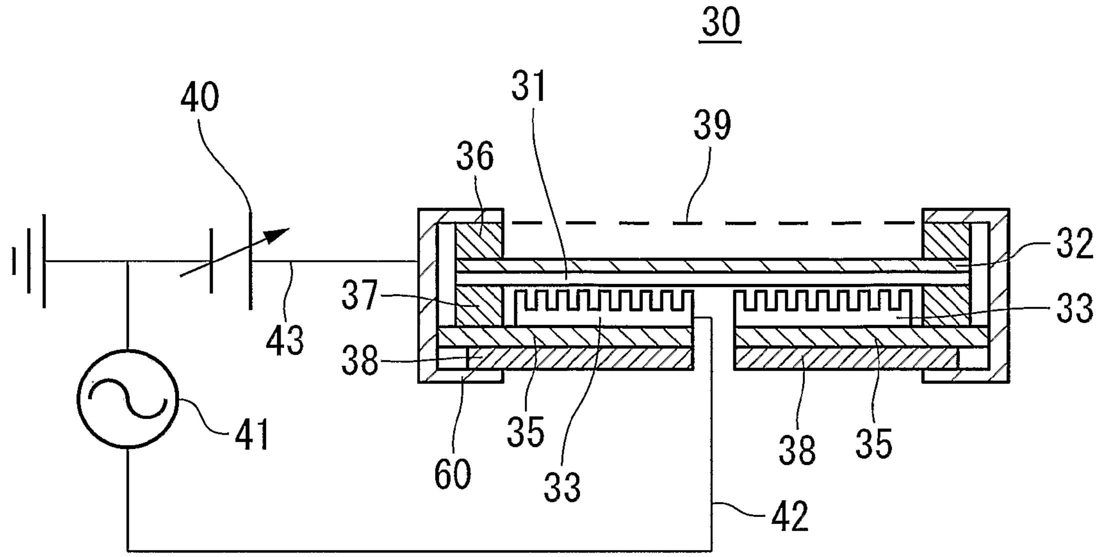
FIG. 3A is a diagram showing an example of the ultrasonic transducer used in the embodiment.

FIG. 3A is a diagram showing an example of the ultrasonic transducer used in the present embodiment. The electrostatic ultrasonic transducer shown in FIG. 3A has a dielectric (material) 31 (i.e., an insulator) such as a PET (polyethylene terephthalate) resin having a thickness of approximately 3 to 10 μm, as a vibrator. On the upper surface of the dielectric 31, an upper electrode 32, which is a foil made of a metal such as aluminum, is integrally formed by vapor deposition or the like. In addition, a lower electrode 33 made of brass is provided, which contacts the lower surface of the dielectric 31 (in FIG. 3A, the lower electrode 33 is depicted not contacting the lower surface for the sake of making the form of the electrode apparent). A lead 42 is connected to the lower electrode 33, and the lower electrode 33 is fastened to a base plate 35 made of Bakelite or the like.

A lead 43 is connected to the upper electrode 32 and a DC (direct current) bias supply 40. According to this DC bias supply 40, a DC bias voltage of approximately 50 to 150 V is continually applied to the upper electrode 32, so that the upper electrode 32 is attracted to the lower electrode 33. Reference numeral 41 indicates a signal source which corresponds to the output of the power amplifier 14 in FIG. 2.

The dielectric 31, the upper electrode 32, and the base plate 35 are fixedly enclosed in a case 60, together with metal rings 36, 37, and 38, and a mesh 39.

On a surface of the lower electrode 33, which faces the dielectric 31, a number of alternately convex and concave portions are formed, which produce gaps between the lower electrode 33 and the dielectric 31. Accordingly, the convex and concave portions, formed on a surface of the lower electrode, and the dielectric 31 as a vibrating film function as an enormous number of capacitors on a sound wave emitting surface, and generated vibrations are synthesized, thereby generating a high sound pressure in a wide frequency range.

Figure 3B:
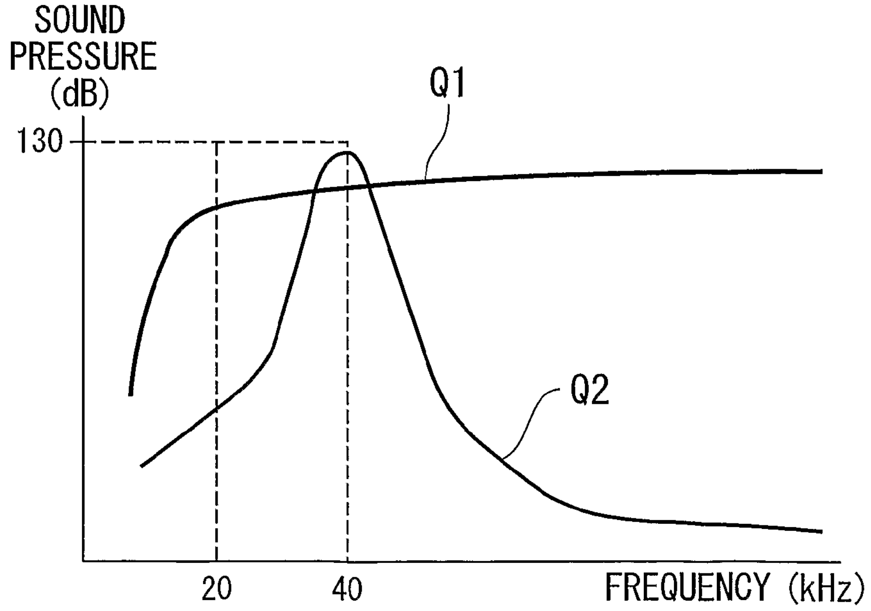
FIG. 3B shows frequency characteristics of an electrostatic ultrasonic transducer and a resonant ultrasonic transducer.

The electrostatic ultrasonic transducer shown in FIG. 3A has wide band frequency characteristics (see curve Q1 in FIG. 3B). FIG. 3B also shows frequency characteristics of a general resonant ultrasonic transducer (see curve Q2) whose center frequency (i.e., the resonance frequency of the piezoceramic element) is, for example, 40 kHz. In contrast, in the frequency characteristics of the above electrostatic ultrasonic transducer, an almost flat characteristic is obtained approximately from 20 kHz to 100 kHz. Owing to such a flat characteristic, the frequency of the carrier wave signal can be variably set.

A specific example of the structure of the distance measuring system 100 will be explained below.

Figure 4A:
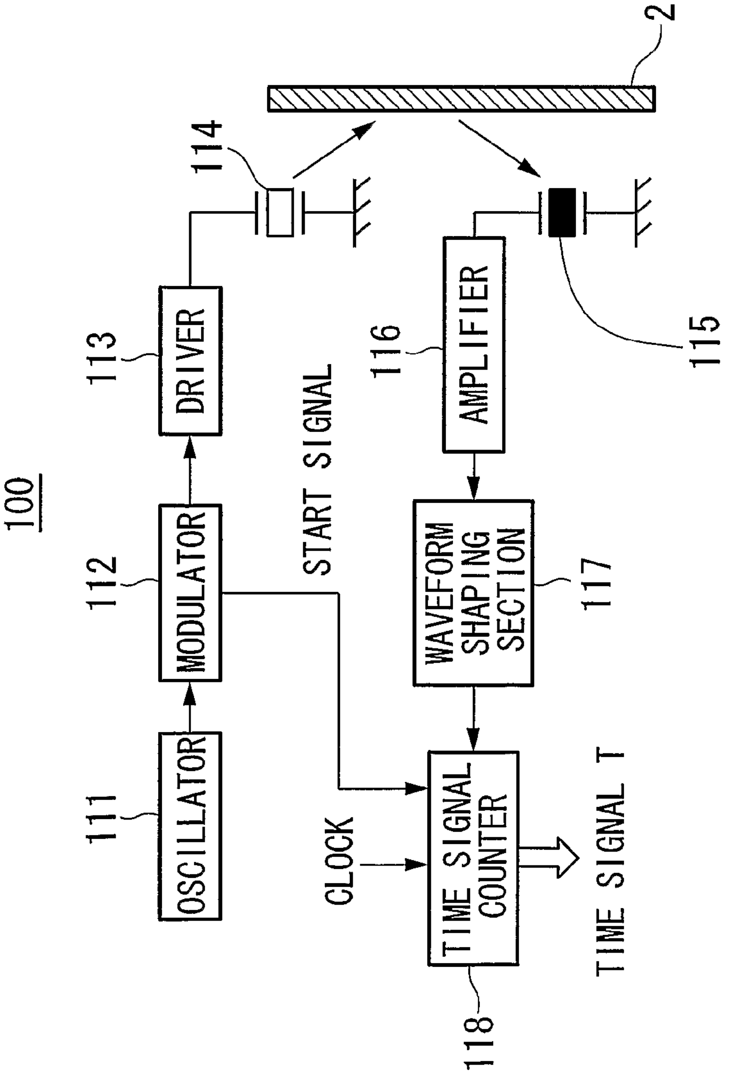
FIGS. 4A and 4B are diagrams showing a specific example of the distance measuring system.
Figure 4B:
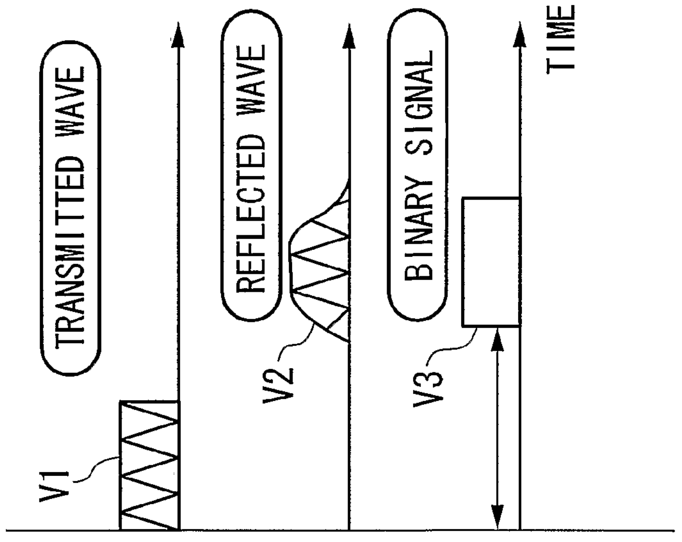

FIGS. 4A and 4B are diagrams showing a specific example of the distance measuring system 100 in which an ultrasonic transmitter (i.e., an ultrasonic transducer) and an ultrasonic receiver, devices for measuring the distance, are separately provided. FIG. 4A is a block diagram for showing the structure, and FIG. 4B is a diagram showing operational waveforms (i.e., temporal variations in voltage).

Reference numeral 111 indicates an oscillator which generates, for example, an AC (alternating current) signal of a frequency of 100 kHz.

Reference numeral 112 indicates a modulator which repeatedly outputs a rectangular wave signal having a specific temporal width, modulated by the signal output from the oscillator 111. The modulator 112 also outputs a start signal which indicates the start time of the output of each rectangular wave signal. The rectangular wave signal V1 output from the modulator 112 is shown in FIG. 4B. The output from the modulator 112 is sent to the driver 113 so as to amplify the signal. The output from the driver 113 is applied to the ultrasonic transmitter 114, so that an ultrasonic signal is generated from the ultrasonic transmitter 114 (i.e., the ultrasonic transducer).

The ultrasonic wave (signal) generated in the ultrasonic transmitter 114 is reflected by the screen 2, and the reflected signal is received by the ultrasonic receiver 115. The ultrasonic receiver 115 may be an ultrasonic transducer similar to the ultrasonic transmitter 114 or a conventional resonant or electrostatic ultrasonic transducer. The waveform V2 of the output from the ultrasonic receiver 115 is also shown in FIG. 4B.

The output of the ultrasonic receiver 115 is amplified by the amplifier 116 and the waveform of the amplified signal is further shaped by a waveform shaping section 117, thereby producing a binary signal V3 shown in FIG. 4B. Reference numeral 118 indicates a time signal counter 118 which measures an elapsed period of time (T) from the input of the start signal to the input of the binary signal by using a specific clock signal as a reference, and outputs the measured result as a time signal T. Based on the time signal T, the distance to the screen 2 can be obtained.

Figure 5:
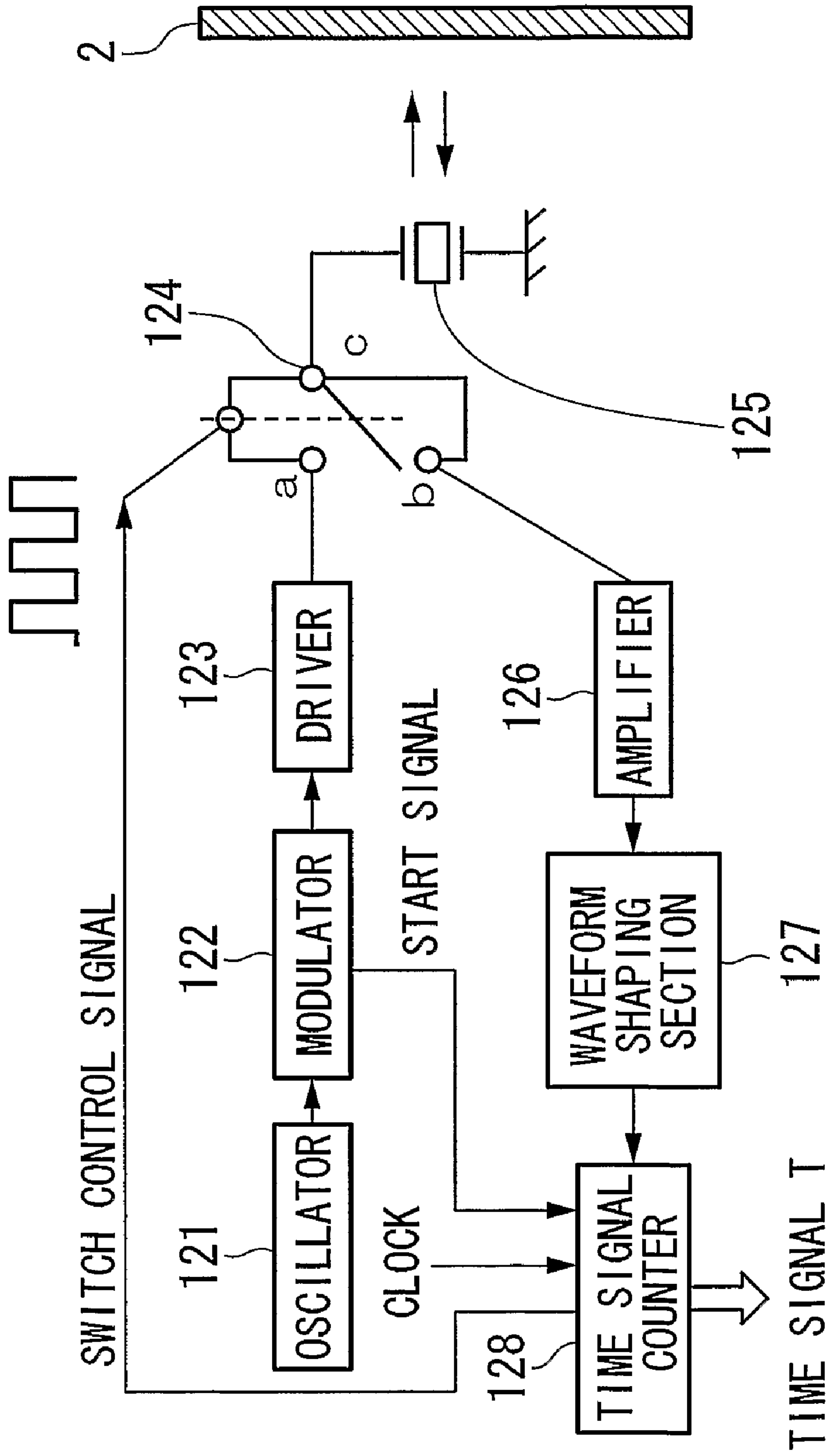
FIG. 5 is a block diagram showing another specific example of the distance measuring system.

FIG. 5 is a block diagram showing another specific example of the distance measuring system 100, in which the ultrasonic transmitter and the ultrasonic receiver, provided for measuring the distance, are combined as a single device. Reference numeral 121 indicates an oscillator which generates, for example, an AC signal of a frequency of 100 kHz. Reference numeral 122 indicates a modulator which repeatedly outputs a rectangular wave signal having a specific temporal width, and outputs a start signal which indicates the start time of the output of each rectangular wave signal. The output end of the modulator 122 is connected via a driver 123 to a contact “a” of a selector switch 124, and a contact “b” of the selector switch 124 is connected to the input end of an amplifier 126. Additionally, the output of the amplifier 126 is input into a waveform shaping section 127. A terminal “c” of the selector switch 124 is grounded via an ultrasonic transceiver 125 (i.e., an ultrasonic transmitter/receiver).

According to a control signal output from a time signal counter 128, the selection or operation mode of the selector switch 124 can be switched between (i) a transmission mode (selected by the contact “a”) in which the ultrasonic transceiver 125 functions as a transmitter for sending an ultrasonic wave (signal) to the screen 2, and (ii) a reception mode (selected by the contact “b”) in which the ultrasonic transceiver 125 functions as a receiver for receiving a reflected wave of the ultrasonic wave, from the screen 2. That is, the ultrasonic wave generated from the ultrasonic transceiver 125 is reflected by the screen 2 and is received by the same ultrasonic transceiver 125.

When the start signal is input into the time signal counter 128, a switch control signal is sent from the time signal counter 128 to the selector switch 124, so that the contacts a and c are connected to each other and an ultrasonic wave having a rectangular waveform is emitted from the ultrasonic transceiver 125 to the screen 2. After completion of the transmission of the signal having the rectangular waveform, the contacts b and c of the selector switch 124 are connected to each other according to a switch control signal from the time signal counter 128, so that the ultrasonic transceiver 125 receives the ultrasonic signal reflected by the screen 2. The succeeding process is similar to that performed in the example shown in FIG. 4A, that is, the elapsed period of time T from the input of the start signal to the input of the binary signal is measured and the measured result is output as the time signal T. The distance to the screen 2 can be computed based on the time signal T.

Based in the distance data obtained by the distance measuring system 100, the carrier frequency of the ultrasonic wave is determined. The specific method for determining the frequency will be explained below.

Generally, the ultrasonic wave strongly attenuates in the air, and this characteristic is effectively used. The attenuation characteristics of the ultrasonic wave in the air are given by the following formula (1).

$$-N = 20\log\left(\frac{x_1}{x}\right) - \alpha x \tag{1}$$

Here, −N (dB) indicates propagation loss, x(m) indicates the distance from the ultrasonic transducer (i.e., x=r in the present embodiment), $x_1$ indicates a reference point which is defined at 1 meter from the ultrasonic transducer, and α indicates an attenuation constant. The attenuation constant is computed by "$10^{-10}\times f^2$" (f is the frequency) when the medium is air.

Figure 6:
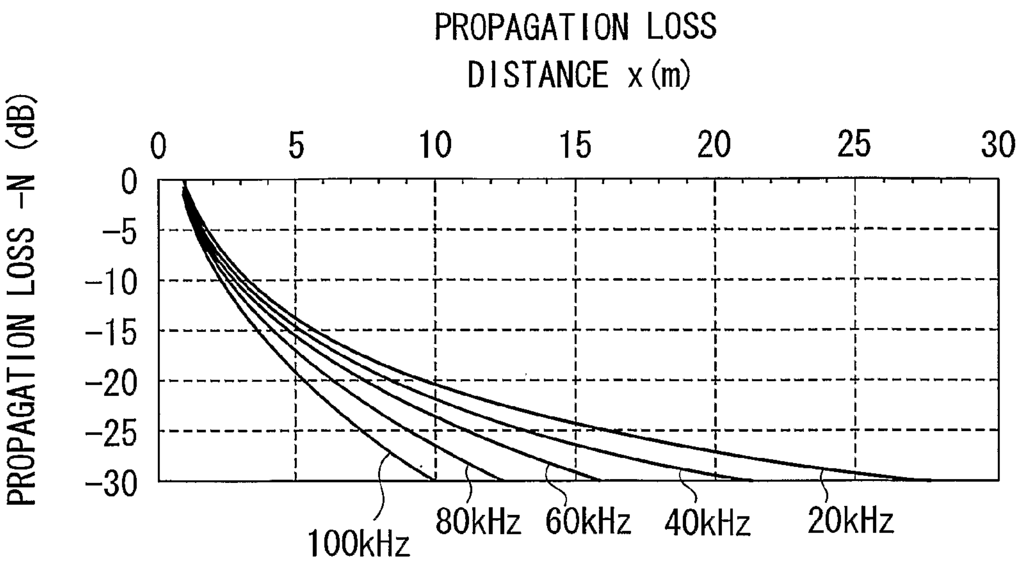
FIG. 6 shows the propagation attenuation characteristics computed using the formula (1) with parameters which are frequencies every 20 kHz within a range from 20 kHz to 100 kHz as parameters.
Figure 7:
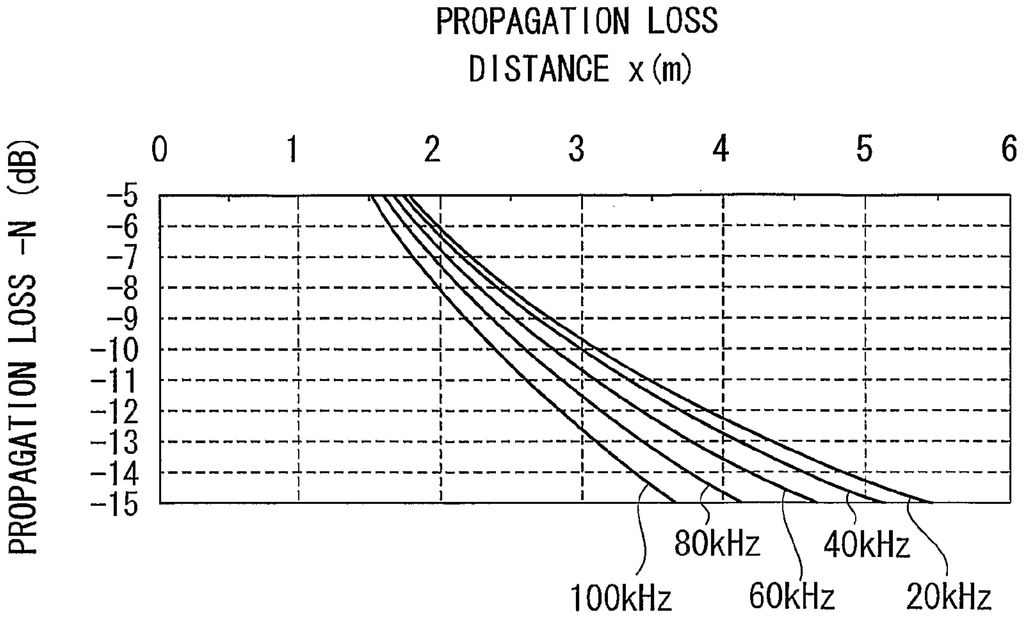
FIG. 7 also shows the propagation attenuation characteristics computed using the formula (1).
Figure 8:
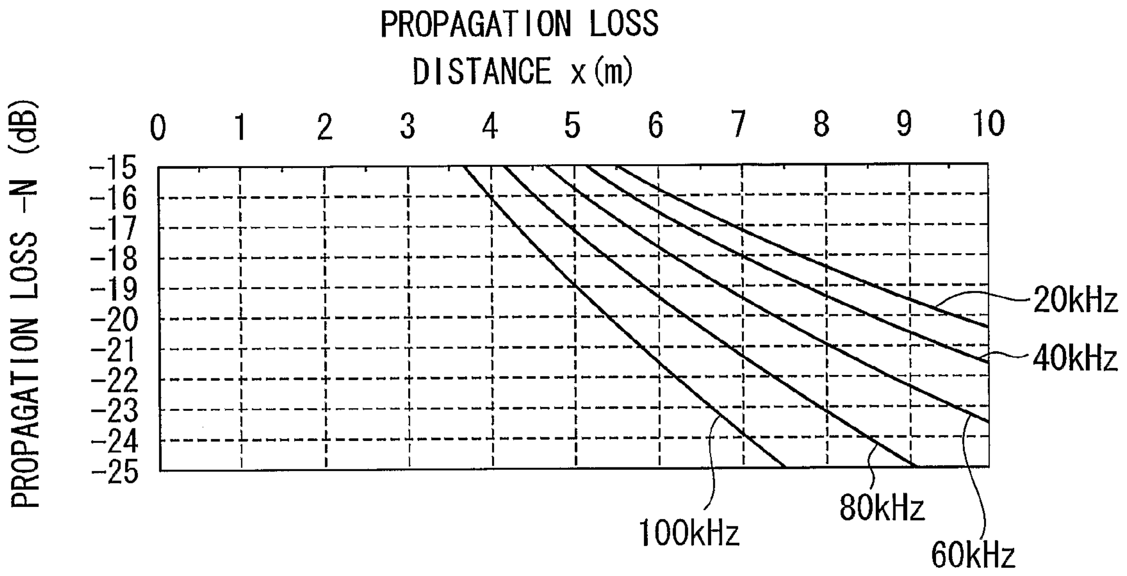
FIG. 8 also shows the propagation attenuation characteristics computed using the formula (1).

FIGS. 6 to 8 show the propagation attenuation characteristics computed using the above formula (1) with parameters which are frequencies every 20 kHz within a range from 20 kHz to 100 kHz as parameters.

As shown in FIG. 6, the ultrasonic wave first strongly attenuates regardless of the frequency, that is, for a while after start of transmission, the degree of attenuation is almost uniform for each frequency. However, after that, the higher the frequency, the stronger the attenuation. FIG. 7 is an enlarged view of an area where the sound pressure decreases by approximately −10 dB from a reference sound pressure. Some preferable examples will be provided below.

When a sound pressure of 130 dB is generated and a sound pressure of 120 dB due to attenuation of −10 dB is required on the screen and the distance between the projector and the screen is 3 m, the most preferable frequency to be selected is 40 kHz (see FIG. 7).

When a sound pressure of 140 dB is generated and a sound pressure of 120 dB due to attenuation of −20 dB is required on the screen and the distance between the projector and the screen is 7.4 m, the most preferable frequency to be selected is 60 kHz (see FIG. 8).

When a sound pressure of 150 dB is generated and a sound pressure of 120 dB due to attenuation of −30 dB is required on the screen and the distance between the projector and the screen is 10 m, the most preferable frequency to be selected is 100 kHz (see FIG. 6).

Other than the above three examples, there are various combinations of the generated sound pressure and the selected frequency, and a suitable combination of the parameters can be flexibly selected according to the environment in which it is to be used.

In the distance measuring systems shown in FIGS. 4 and 5, the ultrasonic sensor (such as an ultrasonic transmitter, receiver, or transceiver) for measuring the distance is independently provided apart from the ultrasonic transducer for producing a sound signal; however, the ultrasonic transducer for producing a sound signal may also function as an ultrasonic sensor for measuring the distance.

Figure 9:
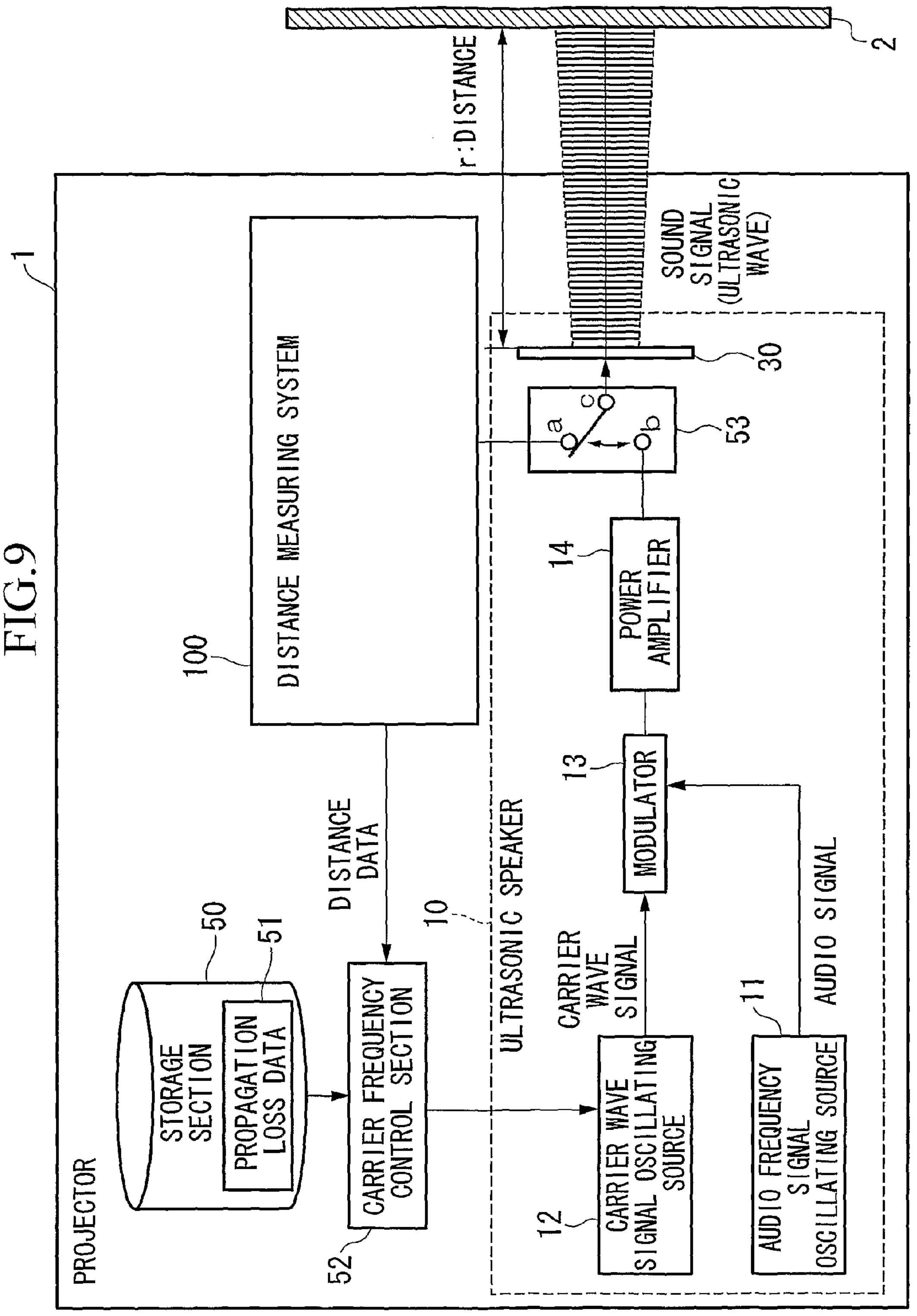
FIG. 9 is a block diagram showing an example of the structure of using a common device as the ultrasonic distance sensor and the ultrasonic transducer for reproducing a sound signal.

FIG. 9 is a block diagram showing an example of the structure of using a common device as the ultrasonic sensor and the ultrasonic transducer for reproducing a sound signal.

In the example shown in FIG. 9, a mode selector switch 53 is provided. In the distance measuring mode, contacts a and c are connected so as to connect the distance measuring system 100 and the ultrasonic transducer 30. The ultrasonic transducer 30 itself has a function of transmitting an ultrasonic wave and a function of receiving an ultrasonic wave as a condenser microphone; thus, the ultrasonic transducer 30 can also function as an ultrasonic transceiver as shown in FIG. 5.

In the sound signal output mode, contacts b and c of the mode selector switch 53 are connected so as to connect the power amplifier 14 and the ultrasonic transducer 30, thereby forming an ordinary ultrasonic speaker circuit. There are various operation examples of the mode selection. In an example, the distance measurement mode is first selected, and after the carrier frequency is determined, the sound signal output mode is automatically selected. Accordingly, the ultrasonic transducer for reproducing the sound signal can also be used as an ultrasonic sensor (i.e., a distance sensor), thereby realizing a remarkably economical system.

Figure 10:
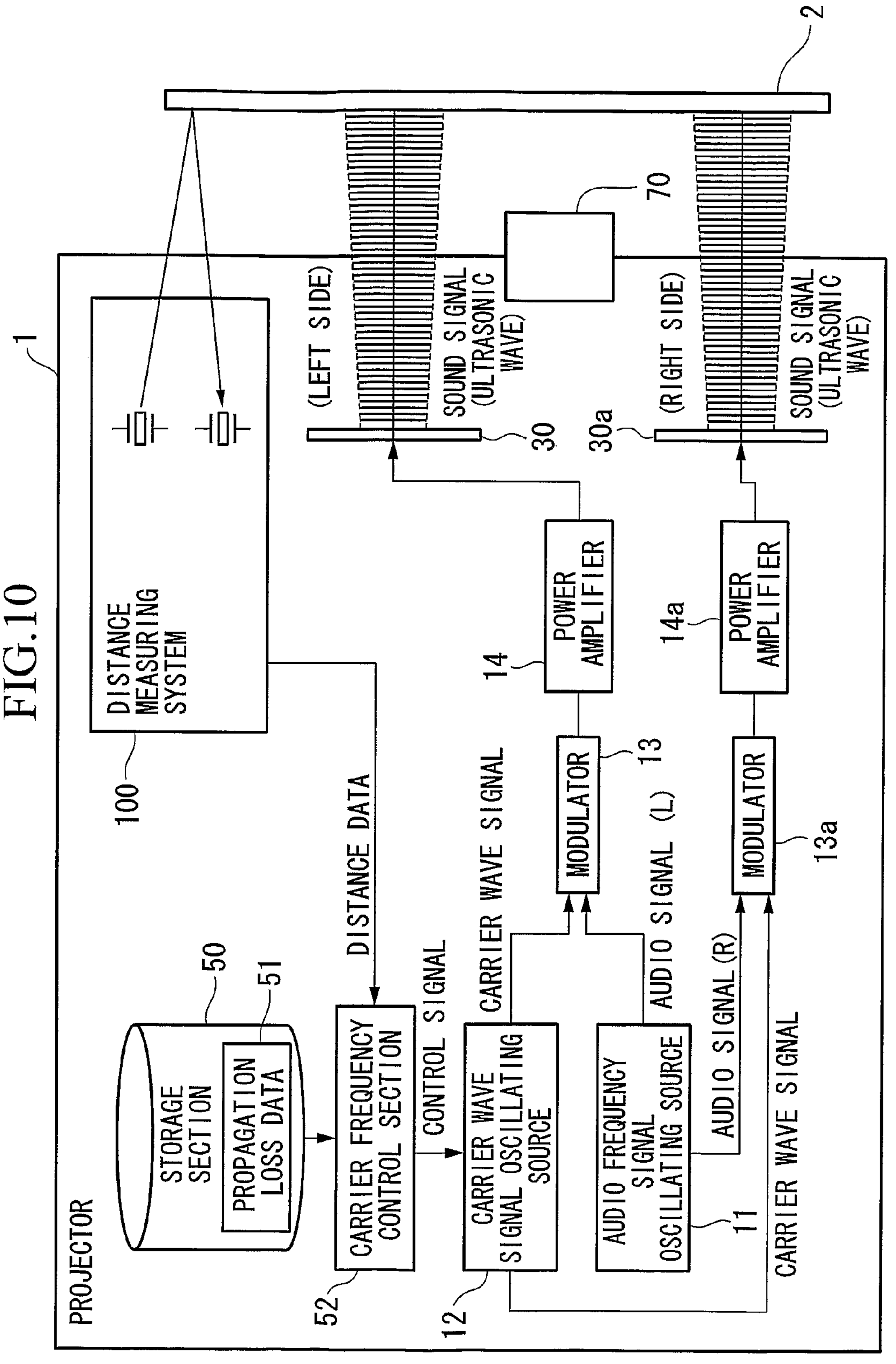
FIG. 10 is a block diagram showing an example of the structure of a stereophonic projector.

The projectors shown in FIGS. 2 and 9 have only one ultrasonic speaker for a monophonic system; however, the present invention can of course be applied to a stereophonic projector having a plurality of ultrasonic speakers, as shown in FIG. 10.

FIG. 10 is a block diagram showing an example of the structure of a stereophonic projector. In the projector of this figure, a power amplifier **14*a*, a modulator 13*a*, and an ultrasonic transducer 30*a* are added to the elements of the projector shown in FIG. 2. According to the added elements, a sound signal at the right (R) side is output. The originally provided elements (i.e., the portions shown in FIG. 2) perform measurement of the distance between the ultrasonic transducer 30 and the screen 2**, control of the frequency of the carrier wave, and output of the sound signal at the left side.

As explained above, in the projector according to the present invention, an ultrasonic speaker having a wide band ultrasonic transducer is mounted, and the projector has a function of measuring the distance between the projector and the screen and a function of controlling the frequency of the carrier wave signal according to the measured distance. Therefore, directivity is not too strong, and it is possible to realize a projector for producing an audio signal which widely spreads after being reflected by a screen. By using a projector according to the present invention, a simple home theater or a simple environment for the education/culture market can be realized without providing a complicated speaker system.

In the above embodiment, the distance measuring system 100 uses an ultrasonic sensor (i.e., an ultrasonic transducer); however, instead of the ultrasonic transducer, an infrared sensor may be employed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

According to the present invention, even when using an ultrasonic speaker having strong directivity, no self-demodulation of the ultrasonic wave signal reflected by the screen is produced, and human-audible sound, produced by self-demodulation before reflection, is reflected by the screen and spreads over a wide area in a room, which is effective in a home theater or in an environment for the education/culture market.

I claim:

1. A projector comprising:

an ultrasonic speaker including an ultrasonic transducer for emitting an ultrasonic wave signal to a screen;

a distance measuring device for measuring a distance between the ultrasonic transducer and the screen; and an ultrasonic frequency control device for controlling a frequency of the ultrasonic wave signal based on a measured result of the distance measuring device and a sound pressure of the ultrasonic wave signal emitted by the ultrasonic transducer, so that the ultrasonic wave signal has a predetermined sound pressure at or in a vicinity of the screen.

2. A projector as claimed in claim 1, further comprising:

a storage device for storing a propagation loss characteristic in air of the ultrasonic wave signal emitted from the ultrasonic transducer, wherein:

the ultrasonic frequency control device controls the frequency of the ultrasonic wave signal by referring to the propagation loss characteristic of the ultrasonic wave signal stored in the storage device.

3. A projector as claimed in claim 1, wherein:

the ultrasonic frequency control device computes a frequency of the ultrasonic wave signal emitted by the ultrasonic transducer, by which the ultrasonic wave signal has the predetermined sound pressure at or in a vicinity of the screen, based on the measured result of the distance measuring device and a specific operation formula which indicates a propagation loss characteristic in air of the ultrasonic wave signal; and the specific operation formula is:

$$-N = 20\log\left(\frac{x_1}{x}\right) - ax$$

where −N, whose unit is decibel, indicates propagation loss; x, whose unit is meter, indicates the distance from the ultrasonic transducer to the screen: $x_1$ indicates a reference point defined at 1 meter from the ultrasonic transducer; and α indicates an attenuation constant computed by $10^{-10} \times f^2$, f being the frequency of the ultrasonic wave signal.

4. A projector as claimed in claim 1, wherein the distance measuring device is an independent device separate from the ultrasonic speaker and employs an ultrasonic sensor for measuring the distance.

5. A projector as claimed in claim 1, wherein the distance measuring device is an independent device separate from the ultrasonic speaker and employs an infrared sensor for measuring the distance.

6. A projector as claimed in claim 1, wherein the distance measuring device includes a first ultrasonic transducer for transmitting an ultrasonic wave to the screen and a second ultrasonic transducer for receiving a reflected wave from the screen.

7. A projector as claimed in claim 1, wherein the distance measuring device includes an ultrasonic transducer which transmits an ultrasonic wave to the screen and also receives a reflected wave from the screen.

8. A projector as claimed in claim 1, wherein the ultrasonic transducer also functions as an ultrasonic sensor for measuring the distance in the distance measuring device.

9. A method of controlling an ultrasonic speaker which includes an ultrasonic transducer for emitting an ultrasonic wave signal to a screen, the method comprising the steps of:

measuring a distance between the ultrasonic transducer and the screen; and controlling a frequency of the ultrasonic wave signal based on a measured result of the step of measuring the distance and a sound pressure of the ultrasonic wave signal emitted by the ultrasonic transducer, so that the ultrasonic wave signal has a predetermined sound pressure at or in a vicinity of the screen.

* * * * *